United States Patent [19]
Harvey

[11] Patent Number: 5,854,125
[45] Date of Patent: Dec. 29, 1998

[54] DUMMY FILL PATTERNS TO IMPROVE INTERCONNECT PLANARITY

[75] Inventor: Jerry L. Harvey, San Antonio, Tex.

[73] Assignee: VLSI Technology, Inc., San Jose, Calif.

[21] Appl. No.: 803,809

[22] Filed: Feb. 24, 1997

[51] Int. Cl.$^6$ ................................................. H01L 21/463
[52] U.S. Cl. .................. 438/626; 438/631; 438/646; 438/926; 438/697
[58] Field of Search .................... 438/626, 631, 438/646, 926, 697, 633, 692, 698

[56] References Cited

U.S. PATENT DOCUMENTS

| | | | |
|---|---|---|---|
| 4,775,550 | 10/1988 | Chu et al. ................................. | 427/38 |
| 4,916,514 | 4/1990 | Nowak ...................................... | 357/68 |
| 5,003,062 | 3/1991 | Yen .......................................... | 437/231 |
| 5,089,442 | 2/1992 | Olmer ...................................... | 432/235 |
| 5,173,448 | 12/1992 | Yanagi ..................................... | 437/186 |
| 5,182,235 | 1/1993 | Eguchi ..................................... | 437/238 |
| 5,278,105 | 1/1994 | Eden et al. .............................. | 437/250 |
| 5,441,915 | 8/1995 | Lee . | |
| 5,459,093 | 10/1995 | Kuroda et al. . | |
| 5,461,010 | 10/1995 | Chen et al. .............................. | 437/228 |
| 5,470,802 | 11/1995 | Gnade et al. ........................... | 437/238 |
| 5,476,817 | 12/1995 | Numata ................................... | 437/195 |
| 5,488,015 | 1/1996 | Havemann et al. .................... | 437/195 |
| 5,494,853 | 2/1996 | Lur .......................................... | 437/195 |
| 5,494,854 | 2/1996 | Jain ......................................... | 437/195 |
| 5,510,293 | 4/1996 | Numata ................................... | 437/195 |
| 5,618,757 | 4/1997 | Bothra et al. ........................... | 438/699 |

OTHER PUBLICATIONS

S. Wolf "Silicon Processing for the VLSI Era vol. 2" Lattice Press (Calif.) pp. 179–180, 1990.
Ichikawa, et al., "Multilevel Interconnect System for 0.35um CMOS Lsi's with Metal Dummy Planarization Process and Thin Tungsten Wirings", Jun. 27–29, 1995 VMIC Conference, 1995 ISMIC—104/95/0254.

Primary Examiner—Caridad Everhart
Attorney, Agent, or Firm—Hickman & Martine, LLP

[57] ABSTRACT

A method of improving the planarity of spin-on glass layers in semiconductor wafer processing is disclosed. Gaps in between active conductive traces on a trace layer of a semiconductor wafer that exceed a predetermined threshold distance are provided with dummy surfaces arranged in a micro-pattern in order to improve the planarity achieved in subsequently applied spin-on glass layers. In some embodiments, the predetermined threshold distance is greater than approximately 2 micrometers, as for example in the range of approximately 4.65 to 5 micrometers. In some applications, both the active conductive traces and the dummy surfaces are formed from a metallic material that is deposited in one single step with a dielectric layer being deposited over both the active conductive traces and the dummy surfaces prior to application of the spin-on glass layer.

20 Claims, 6 Drawing Sheets

DUMMY FILL PATTERNS TO IMPROVE INTERCONNECT PLANARITY

BACKGROUND OF THE INVENTION

1. Field of Invention

The present invention relates to methods of fabricating integrated circuits. More particularly the use of oriented dummy surfaces to fill gaps in trace layers prior to a spin-on glass process is disclosed to improve interconnect planarity during fabrication.

2. Description of the Prior Art

Maintaining the planarity of a semiconductor wafer surface during fabrication is crucial to insure that there is no accidental coupling of active conductive traces between different layers of active conductive traces on integrated circuits housed on the wafer, and further to provide a surface with a constant height for any subsequent lithography processes. There are many processes which are intended to improve the planarity of a wafer surface during fabrication.

Spin-on glass (SOG), with or without etchback, is one process commonly used to improve the interconnect planarity of a semiconductor wafer surface during fabrication. In the SOG process, SOG is dispensed at the centerpoint of a semiconductor wafer, which contains a plurality of integrated circuits, while the wafer is rotated in order to spread the SOG as evenly as possible. As a result of its viscosity, SOG flows on the wafer in a weak spiral pattern which can be approximated as a center-to-edge flow pattern. The SOG is intended to fill gaps formed between active metal traces on the surface of the wafer. After the SOG has been deposited, it may be etched back to expose portions of at least some of a dielectric layer that covers the metal trace layer. The purpose of exposing the dielectric layer is to enable a via etch process to take place without vias having to be created through a layer of SOG.

It has been observed that the effectiveness of SOG-based planarization is dependent on the underlying pattern of interconnect lines and spaces on the surface of an integrated circuit. SOG easily fills in narrow spaces, but cannot adequately fill in large gaps while maintaining both the nominal thickness of SOG over the portions of the dielectric layer which overlay the active conductive traces, and the nominal thickness of SOG on a flat surface away from topography. In some existing submicron devices, significant indentations begin to appear in the SOG layer between adjacent interconnect lines which are greater than approximately 5 micrometers apart. When the gaps between adjacent interconnect lines have a width of greater than approximately 10 micrometers, the SOG in the gaps is virtually nonexistent. Thus, while SOG can improve local planarity, i.e. planarity between metal lines which are close in spacing, it is not as efficient in improving global planarity, i.e. planarity between metal lines which are far apart. This leads to problems during optical lithography when the depth of focus is inadequate for surfaces which do not have sufficiently small variations in height.

FIG. 1 is a diagrammatic illustration of the surface of a semiconductor wafer having a substrate 10 on which metal lines 12, 14, 16 are situated. A dielectric layer 18 is deposited over metal lines 12, 14, 16. A layer of SOG 30 is then deposited over the dielectric layer. In areas where adjacent metal lines are relatively closely spaced (such as gap 26, which is formed between traces 14 and 16), the gaps between adjacent metal lines are adequately filled by SOG 30. However in areas where adjacent metal lines are spaced relatively farther apart (such as gap 28 between traces 12 and 14), indentations 29 have a tendency to form in SOG layer 30. Local planarity between metal lines 14 and 16 is improved, while global planarity between metal lines 12 and 14 shows marginal improvement.

While the conventional SOG process is effective in achieving local planarity on the surface of a semiconductor wafer, there is ample room for improvements which can be made to achieve planarity across the entire surface of a semiconductor wafer using the SOG process.

SUMMARY OF THE INVENTION

To achieve the foregoing and other objects and in accordance with the purpose of the present invention, gaps between active conductive traces in a trace layer that exceed a predetermined threshold distance are provided with dummy surfaces having a specific geometry in order to improve the planarity achieved in subsequently applied spin-on glass layers. The dummy surfaces differ from the active conductive traces in that they are not arranged to electrically couple any elements on the wafer and they are arranged in a predefined micro-pattern with respect to the wafer. In a method aspect of the invention, an active trace layer is created by forming a multiplicity of active conductive traces on a substrate of the wafer. The respective active conductive traces are arranged to electrically couple associated elements on the wafer when the processing is completed. The active conductive traces are arranged such that there are gaps exceeding a predetermined threshold distance between at least some adjacent ones of the traces. A multiplicity of dummy surfaces are also formed on the substrate in the gaps. In some preferred embodiments, the dummy surfaces are formed from the same material as the active conductive traces and are laid down at the same time as the active conductive traces.

After the active conductive traces and dummy surfaces have been laid, a dielectric layer is deposited over the active conductive traces and dummy surfaces to electrically insulate the active conductive traces. A layer of spin-on glass (SOG) is then deposited over the dielectric layer to provide a planar surface on the wafer. The SOG layer is superimposed over the active conductive traces and the dummy surfaces. After the SOG layer has been spun into place, it may be etched back to expose at least portions of the dielectric layer directly overlying active conductive traces. The etchback may be necessary in order to permit the formation of vias between the trace layer and elements superimposed above the dielectric layer when further processing is done on the wafer.

The predefined micro-pattern of dummy surfaces may take on a variety of orientations. In one orientation, the dummy surfaces are rectangular dummy line segments arranged in a herringbone pattern. In other orientations, the dummy surfaces may be crosses arranged in a cross-fill pattern, T-shaped surfaces arranged in a T-fill pattern, or L-shaped surfaces arranged in an L-fill pattern. It is expected that the dummy surfaces will often be incomplete as they are interspersed among active conductive traces on an active trace layer of a wafer. The micro-patterns of dummy surfaces impede the flow of SOG, thereby further improving the planarity of the wafer surface when the step of spinning on glass is completed. Micro-patterns of dummy surfaces are such that they may permit a plurality of integrated circuits to be formed on the wafer using a single reticle.

In a preferred embodiment, the aforementioned predetermined threshold distance is greater than approximately 2 micrometers, as for example in the range of approximately 4.65 to 5 micrometers. Also in a preferred embodiment, the dummy line segments have a first surface dimension in the range of approximately 1.0 to 2.4 micrometers, and a second surface dimension in the range of approximately 1.0 to 12.0 micrometers. In a method relating to a preferred embodiment, both the active conductive traces and the dummy surfaces are formed from a metallic material that is deposited in one single step with the dielectric layer being deposited over both the active conductive traces and the dummy surfaces. Integrated circuits formed using this method are also described.

BRIEF DESCRIPTION OF THE DRAWINGS

The invention, together with further objects and advantages thereof, may best be understood by reference to the following description taken in conjunction with the accompanying drawings in which:

FIG. 5b is a diagrammatic top view of the surface of a reticle containing dummy surfaces oriented in a herringbone pattern as shown in FIG. 5a.

DETAILED DESCRIPTION OF THE INVENTION

Figure 1:
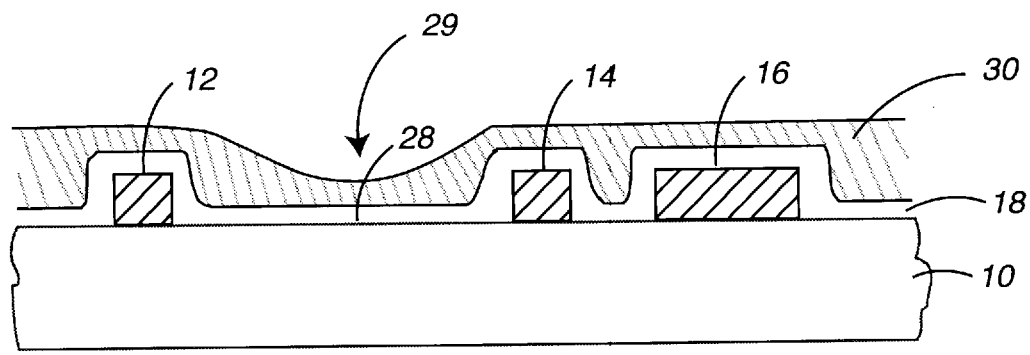
FIG. 1 is a diagrammatic side view of a wafer segment illustrating the indentations that occur in conventional spin-on glass application when the active metallic traces that the glass is intended to cover are spaced too far apart.
Figure 2A:
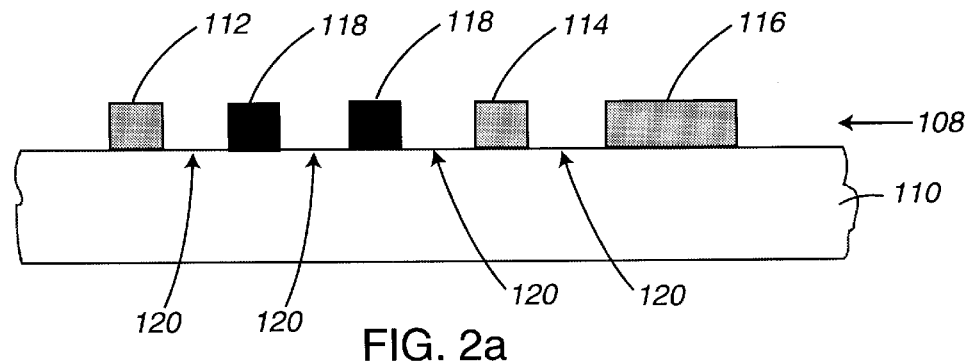
FIG. 2a–d are diagrammatic side views of a wafer segment which illustrate the steps in creating a planar surface on a semiconductor wafer using dummy raised surfaces created from metal in accordance with one preferred embodiment of the present invention.

The present invention will now be described in detail with reference to one preferred embodiment thereof as illustrated in the accompanying drawings. Referring initially to FIG. 2a, as is well known in the wafer processing art one technique that is often used in the production of integrated circuits is the creation of an active trace layer 108 that includes a multiplicity of active conductive traces 112, 114, 116. As shown, active trace layer 108 is formed over a substrate 110. Substrate 110 typically has a large number of electrical elements formed therein which active trace layer 108 is used to at least partially interconnect. Substrate 110 may include any number of distinctly processed layers and may in some circumstances include one or more other trace layers.

As is common in the prior art, the spacing between adjacent traces will vary greatly in accordance with the needs of a particular design. In the segment of the embodiment shown in FIG. 2b, active trace layer 108 includes active conductive traces 112, 114, 116 and dummy surfaces 120 (that includes dummy fill patterns 118) that are situated in regions where the spacing between adjacent active conductive traces, as for example active conductive traces 112 and 114, or 114 and 116, exceeds a predetermined threshold distance. The magnitude of the threshold may vary widely in accordance with the needs of a particular system. By way of example, in most current applications, the threshold will be greater than approximately 2 micrometers, as for example in the range of approximately 4.65 to 5 micrometers. Active conductive traces 112, 114, 116 may be formed from any suitable material, but are typically formed from a metallic material such as an aluminum alloy or a copper alloy. In the embodiment shown, dummy surfaces 120 are formed from the same material as the active conductive traces and are applied in the same step to minimize processing. As shown, dummy surfaces 120 are blocks, with roughly the same dimensions as active conductive traces 1l12, 114, 116, although dummy surfaces 120 may be of any suitable size or shape. Dummy surfaces 120 differ from active conductive traces 112, 114, 116 primarily in that they are not used to electrically couple other elements in the integrated circuit.

Figure 2B:
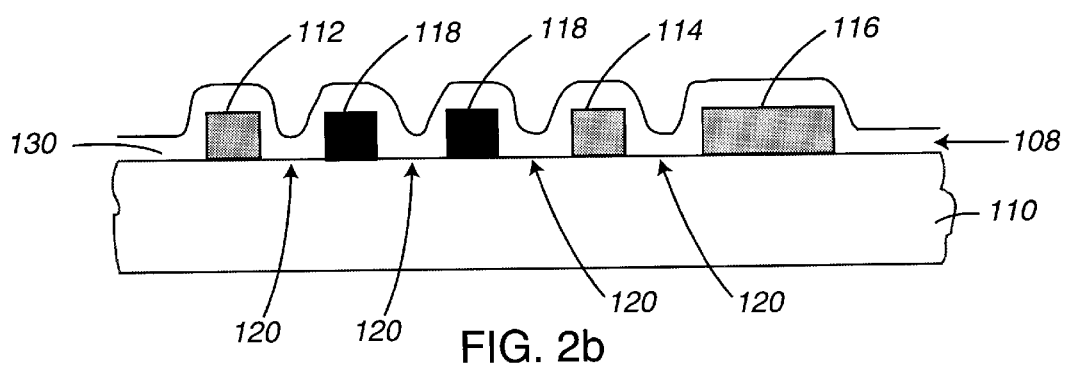

The purpose of adding dummy surfaces 120 in the regions, or gaps, where the spacing between adjacent active conductive traces 112, 114, 116 exceeds a predetermined threshold distance is to help achieve planarity on the surface of an integrated circuit. A dielectric layer 130, such as an oxide layer, is deposited over dummy surfaces 120 and active conductive traces 112, 114, 116 as illustrated in FIG. 2b, in order to electrically insulate active conductive traces 112, 114, 116.

A spin-on glass (SOG) process is commonly used to achieve planarity on the surface of a semiconductor wafer. It has been observed that the effectiveness of SOG is dependent upon the underlying pattern of metal lines and spaces on the surface of an integrated circuit. SOG easily fills in narrow spaces, but cannot adequately fill in large gaps while maintaining both the nominal thickness of SOG over the portions of the dielectric layer which overlay active conductive traces, and the nominal thickness of SOG on a flat surface away from topography.

Figure 2C:
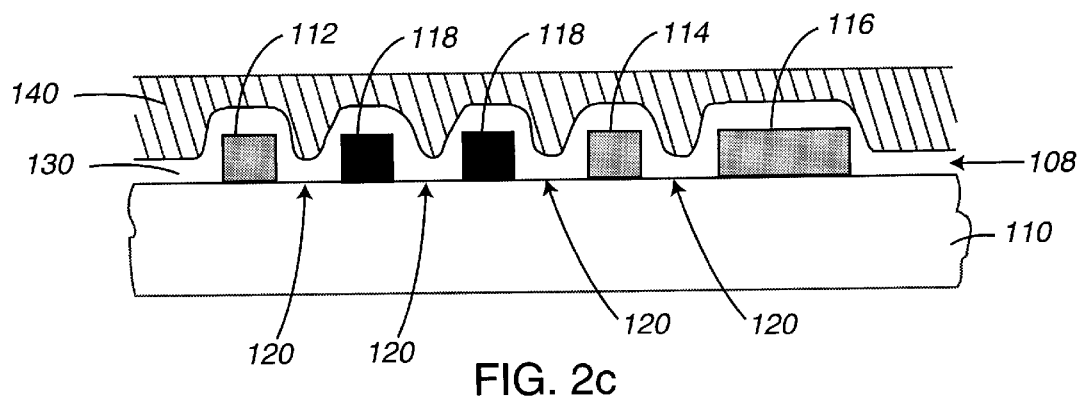
Figure 2D:
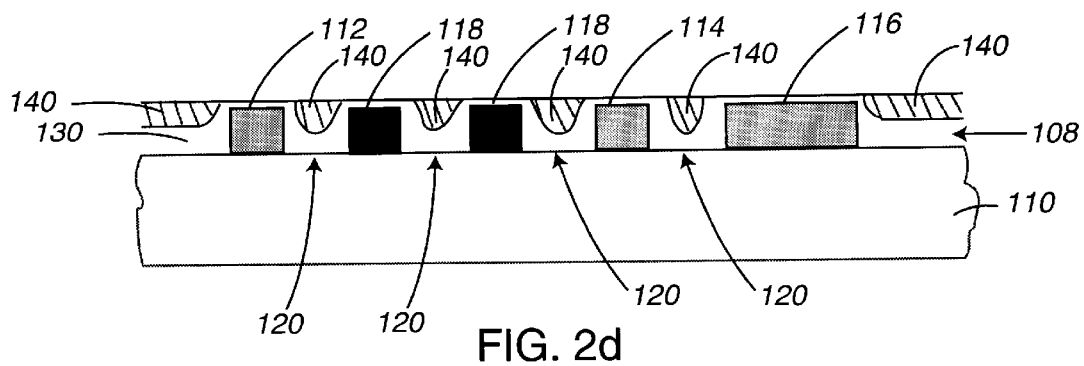

A layer of SOG 140 is deposited and spun over dielectric layer 130 to fill in gaps 160 which do not exceed a predetermined threshold distance between dummy surfaces 120 and active conductive traces 112, 114, 116 as illustrated in FIG. 2c. Because any gaps 160 which exceeded a predetermined threshold distance were eliminated through the use of dummy surfaces 120, SOG 140 is able to fill in gaps 160 evenly and create a planar surface. After the layer of SOG 140 is deposited, SOG layer 140 is etched back to expose at least portions of dielectric layer 130 which cover trace layer 108. By exposing portions of dielectric layer 130 directly over active conductive traces 112, 114, 116, it is possible for interconnections to be made using vias between active trace layer 108 and any overlying trace layers. This process results in a planar surface on the semiconductor wafer, and therefore, the surface of the integrated circuit as illustrated in FIG. 2d.

As will be appreciated by those skilled in the art, SOG is dispensed at the centerpoint of a semiconductor wafer, while the wafer is rotated in order to spread the SOG as evenly as possible. Due to the viscosity of the SOG, the flow of SOG on a wafer is in the form of a weak spiral flow pattern which may be approximated as a center-to-edge flow pattern. The distribution of SOG is such that the layer of SOG may be thinner at the trailing edge of interconnect surfaces with respect to SOG flow. This occurs because the centripetal force exerted on the SOG, which is generated by the rotation of the wafer, forces the SOG to flow toward the edge of the wafer, when there is nothing to impede the flow of SOG. Hence, the coating of SOG may be affected by leading and trailing edge non-uniformities, and the planarity of the surface of the wafer, although greatly improved by the insertion of dummy surfaces, may be somewhat compromised.

The dummy surfaces inserted between active conductive traces on a trace layer of a wafer to improve planarity on the surface of the wafer as described above may be inserted such that they form a pattern. Patterns of dummy surfaces which are perpendicular to the direction of the flow of SOG impede the center-to-edge flow of the SOG. Impeding the flow of SOG prevents the SOG from quickly flowing toward the edge of the wafer, thereby resulting in the SOG being spread more evenly over the entire surface of a semiconductor wafer, which directly results in a further improved planar surface on the surface of the semiconductor wafer.

Figure 3A:
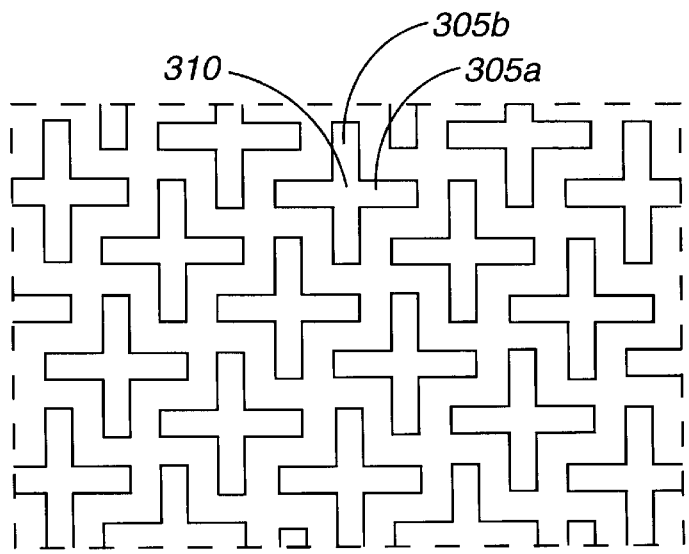
FIG. 3a is a diagrammatic illustration of a pattern of dummy surfaces arranged in a cross-fill pattern in accordance with a first orientation of one preferred embodiment of the present invention.

FIG. 3a is a diagrammatic illustration of a pattern of dummy surfaces which may be interspersed among active conductive traces on the surface of a semiconductor wafer in accordance with a first orientation of one preferred embodiment of the present invention. The pattern of dummy surfaces, also referred to as the dummy fill pattern or the dummy interconnect fill pattern, is a repetitive pattern, comprised of a multiplicity of crosses 310, such that crosses 310 are arranged in a diagonal pattern. Crosses 310 are characterized by two intersecting line segments 305 which have appreciable widths and lengths. In the orientation as shown, line segments 305 intersect at 90 degree angles. The pattern of crosses 310, herein referred to as a cross-fill pattern, are interspersed among active conductive traces on the surface of a semiconductor wafer. Because crosses 310 are interspersed among active conductive traces, it should be appreciated that crosses 310 will not always be complete. The cross-fill pattern serves to impede the approximate center to edge flow of SOG, as the flow of SOG will always be at least approximately perpendicular to a portion of crosses 310. Further, crosses 310 cooperate to force the SOG flow to meander through paths between crosses 310, thereby slowing down the flow of SOG. As a result, the flow of SOG is inhibited from quickly flowing toward the edge of a wafer, thereby resulting in an even coating of SOG, and therefore a planar surface, on the wafer.

Figure 4A:
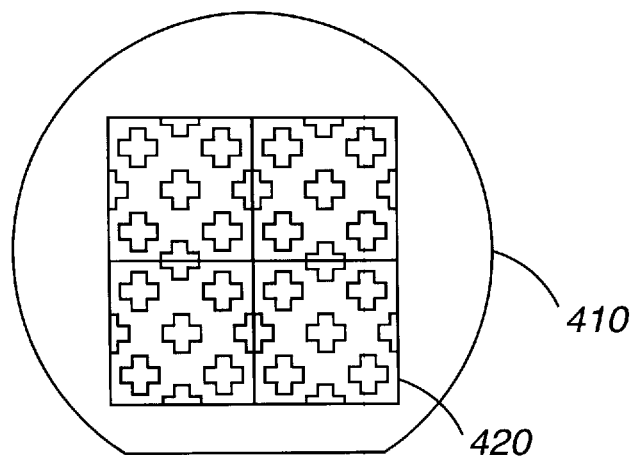
FIG. 4a is a diagrammatic illustration of the surface of a semiconductor wafer with dummy surfaces arranged in a micro-pattern.
Figure 4B:
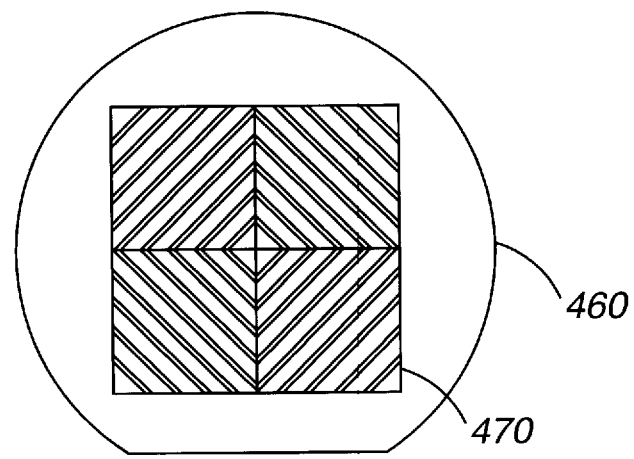
FIG. 4b is a diagrammatic illustration of the surface of a semiconductor wafer with dummy surfaces arranged in a macro-pattern.

The cross-fill pattern is considered to be a micro-pattern. A micro-pattern may be defined as a repetitive pattern which appears to be the same whether it is observed on a relatively small scale or on a relatively large scale. A micro-pattern is a repetitive pattern of intersecting sets of lines or line segments which may be created on a wafer using multiple imprints of a single reticle that is not rotated and which is not simply a single set of parallel lines. A macro-pattern, however, is a repetitive pattern which may only be observed on a relatively large scale. By way of example, in semiconductor fabrication, if it is possible to identify a repetitive pattern of intersecting lines on a reticle used in a lithography process, and the same pattern of lines is identifiable over the surface of a wafer, the pattern is said to be a micro-pattern. FIG. 4a is a diagrammatic top view of a semiconductor wafer with a pattern of intersecting parallel lines as formed by stepping a reticle 420 across the surface of wafer 410. The pattern of intersecting parallel lines is considered to be a micro-pattern because the pattern of lines on reticle 420 is the same as the pattern of lines observed over a substantial portion of wafer 410. On the other hand, if a pattern of lines is evident over the surface of the wafer, but the same pattern as seen on the wafer cannot be identified on a reticle, the pattern is said to be a macro-pattern. FIG. 4b is a diagrammatic top view of a semiconductor wafer 460 with a pattern of lines formed by stepping a reticle 470 across the surface of wafer 460. Note that in order to form the pattern of lines as shown on wafer 460 using only reticle 470, reticle 470 must be rotated as it is stepped across the surface of wafer 460. The pattern of lines on wafer 460 is considered to be a macro-pattern, due to the fact that the pattern of lines on reticle 470 is not the same as the pattern of lines which is evident over a substantial portion of wafer 460. On wafer 460, a pattern of concentric diamonds is observed while on reticle 470, a pattern of diagonal lines is observed. Herein, a pattern which is considered to be identifiable, or observable, on a relatively small scale is a pattern which may be observed over different sections of a wafer, where each section has the same approximate surface dimensions as conventional reticles used for lithography. A pattern which is considered to be identifiable on a relatively large scale is a pattern which may be observed when a significant portion of a wafer is examined.

Referring once again to FIG. 3a, crosses 310, which comprise the cross-fill pattern, are arranged diagonally, and form a micro-pattern. The diagonal pattern of crosses 310 is such that the same pattern of two sets of parallel lines may be observed both on a relatively small scale, and on a relatively large scale. Further, in the orientation shown, the cross-fill pattern is an interlocking pattern, as crosses 310 are organized such that if spaces between crosses 310 were eliminated, crosses 310 would interlock. However, it should be clear that it is also possible to orient crosses 310 in other micro-patterns, as for example a grid of crosses 310 which would not interlock if spaces between crosses 310 were eliminated.

The surface dimensions of crosses 310 and the dimensions of the spaces between adjacent crosses 310 are dependent upon many factors, including the SOG technology used and the tolerance for performance affects caused by the addition of dummy surfaces to a wafer surface. If older SOG technology is used, the gap-fill properties of the SOG may be such that more closely spaced crosses 310 may be necessary to reduce the size of spaces, or gaps, between active conductive traces. Capacitance issues have been observed to occur when dummy surfaces, especially dummy surfaces which are metallic, are added to the surface of a wafer. Since capacitance issues adversely affect the performance of semiconductors, the size of dummy surfaces, as for example crosses 310, which may be added to the surface of a semiconductor wafer may be limited. The surface dimensions of line segments 305 which form crosses 310, as well as the width of the spaces between adjacent crosses 310, are typically determined based upon what is required to achieve a planar surface on a semiconductor wafer without sacrificing a great deal in the area of semiconductor performance. It has been observed that line segments 305 with widths in the range of approximately 1.0 to 2.4 micrometers, as for example approximately 1.0 micrometer, and lengths in the range of approximately 1.0 to 12.0 micrometers, as for example approximately 4.5 micrometers, work well. Spacing between adjacent crosses 310 in the range of approximately 0.35 to 3.0 micrometers, as for example approximately 1.6 micrometers, together with the surface dimensions of crosses 310 as described above, serves to achieve a good compromise between surface planarity, for all types of SOG technology, and semiconductor performance.

Although the use of a cross-fill pattern of dummy surfaces on a surface of a semiconductor wafer has been shown to improve the distribution of SOG on the surface, thereby improving the planarity of the surface, it is at times a rather difficult pattern to implement. Typically, it is necessary to modify crosses 310 in order to intersperse crosses 310 among active conductive traces on a wafer. That is, crosses 310 may be incomplete. It has been shown that even with carefully chosen dimensions for crosses 310, electrical issues may arise when crosses 310, which are commonly made of a metallic material, are modified in order to intersperse crosses 310 among active conductive traces. Among these issues is the potential for several active conductive traces and crosses 310 to become linked together inadvertently. Small variations in the semiconductor fabrication process may lead to small variations in the spacing between crosses 310 and active conductive traces. These variations in spacing, in turn, may lead to several active conductive traces being linked together via crosses 310 if the spacing is reduced to the point where contact between active conductive traces and crosses 310 is initiated. The shape of crosses 310, with two intersecting line segments 305 which may be thought of as forming four "legs" of cross 310, is such that there is a possibility that variations in spacing may very well enable the accidental linkage of several active conductive traces via crosses 310. When active conductive traces and crosses 310 are linked, due to the fact that crosses 310 are commonly made of a metallic material, it is likely that accidental electrical connections will be made.

Figure 3B:
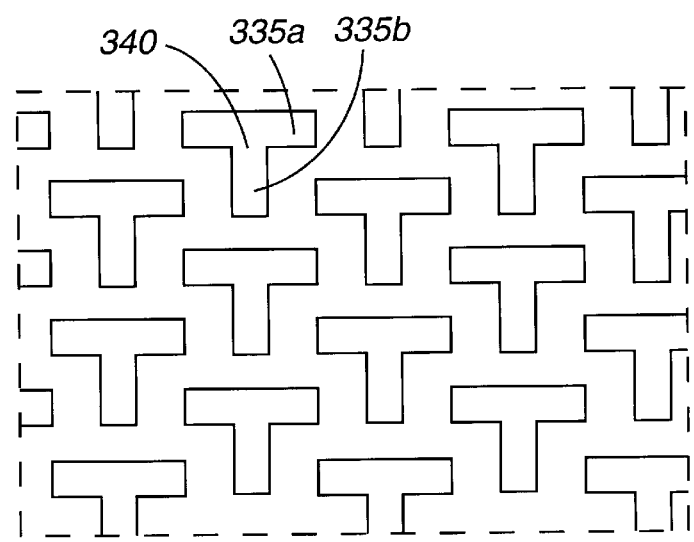
FIG. 3b is a diagrammatic illustration of a pattern of dummy surfaces arranged in a T-fill pattern in accordance with a second orientation of one preferred embodiment of the present invention.

FIG. 3b is a diagrammatic illustration of a pattern of dummy surfaces which may be interspersed among active conductive traces on the surface of a semiconductor wafer in accordance with a second orientation of one preferred embodiment of the present invention. The pattern of dummy surfaces is a micro-pattern, comprised of a multiplicity of "T-shaped" surfaces 340 which are arranged in an interlocking diagonal pattern, although in some orientations, T-shaped surfaces 340 may be arranged in other micro-patterns, as for example T-shaped surfaces 340 aligned in non-interlocking grids. The pattern of T-shaped dummy surfaces as shown in FIG. 3b is herein referred to as a T-fill pattern. T-shaped surfaces 340 may be thought of as crosses, as described above with reference to FIG. 3a, with the intersection of two line segments 335 occurring at the end of one line segment 335b, i.e. three "legs" are formed instead of four. In the orientation as shown, line segments 335 intersect at 90 degree angles. Although T-shaped 340 surfaces have fewer legs than the crosses, the T-fill pattern still serves to impede the flow of SOG, as at some of the intersecting line segments 335 are approximately perpendicular to the flow of SOG at all times, and serve as an obstacle by forcing SOG to meander over and around T-shaped surfaces 340.

The surface dimensions of T-shaped surfaces 340 and the dimensions of the spaces between T-shaped surfaces 340, like the dimensions of crosses and the dimensions of the spaces between crosses as described earlier, are dependent upon many factors. The size of T-shaped surfaces 340 and the spaces between adjacent T-shaped surfaces 340 is typically determined based upon the need to achieve a workable balance between surface planarity and semiconductor performance. Lines 335, which comprise T-shaped surfaces 340, with widths in the range of approximately 1.0 to 2.4 micrometers, as for example approximately 1.0 micrometer, and lengths in the range of approximately 1.0 to 12.0 micrometers, as for example approximately 2.75 micrometers and approximately 4.5 micrometers, have been shown to work well. The dimensions of lines 335 which comprise T-shaped surfaces 340, together with spacing between adjacent T-shaped surfaces 340 in the range of approximately 0.35 to 3.0 micrometers, as for example approximately 1.6 micrometers, provide a good balance between surface planarity and semiconductor performance.

The T-fill pattern of dummy surfaces on a surface of a semiconductor wafer has been shown to successfully impede the distribution of SOG on the surface of the wafer, thereby assisting in the creation of a planar surface on the wafer. The T-fill pattern of dummy surfaces also reduces the likelihood of electrical problems occurring due to small variations in the semiconductor fabrication process, as described above with respect to FIG. 3a and the cross-fill pattern. However, even though the use of T-shaped surfaces 340 instead of crosses reduces the potential for electrical problems to occur as a result of accidental electrical connections, the possibility of accidental connections occurring is still higher than would be desired.

Figure 3C:
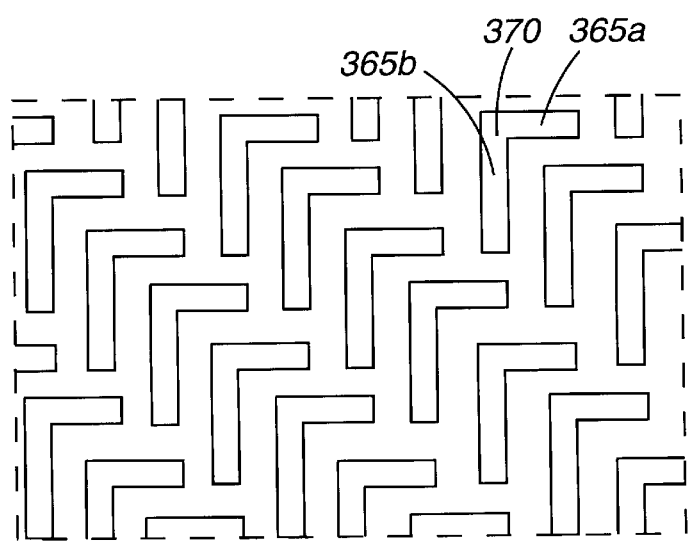
FIG. 3c is a diagrammatic illustration of a pattern of dummy surfaces arranged in an L-fill pattern in accordance with a third orientation of one preferred embodiment of the present invention.

FIG. 3c is a diagrammatic illustration of a pattern of dummy surfaces which may be interspersed among active conductive traces on the surface of a semiconductor wafer in accordance with a third orientation of one preferred embodiment of the present invention. The micro-pattern of dummy surfaces as shown in FIG. 3c is comprised of a multiplicity of "L-shaped" surfaces 370 which are arranged in a diagonal pattern. The pattern of dummy surfaces of this orientation is herein referred to as an L-fill pattern. L-shaped surfaces may be arranged in orientations other than the diagonal orientation as shown. For example, L-shaped surfaces 370 may be arranged in a straight-line grid. L-shaped surfaces 370 are similar to the T-shaped surfaces, as described above with reference to FIG. 3b. The primary difference between the two surfaces is the fact that pairs of line segments 365 which comprise L-shaped surfaces 370, intersect at an end of each line segment 365 such that a top surface 365a and a side surface 365b are formed, while only one line segment of each pair of line segments which comprise T-shaped surfaces intersects the other at an end.

The surface dimensions of L-shaped surfaces 370 and the dimensions of the spaces between L-shaped surfaces 370 are dependent upon many factors, including the need to achieve a balance between surface planarity and semiconductor performance. Like the lines which comprise the T-shaped surfaces described with respect to FIG. 3b, line segments 365 which comprise L-shaped surfaces 370 with widths in the range of approximately 1.0 to 2.4 micrometers, as for example approximately 1.0 micrometer, and lengths in the range of approximately 1.0 to 12.0 micrometers, as for example approximately 2.75 micrometers and approximately 4.5 micrometers, have been shown to work well. The surface dimensions of line segments 365 which comprise L-shaped surfaces 370 as described, together with spacing between adjacent L-shaped surfaces 370 in the range of approximately 0.35 to 3.0 micrometers, as for example approximately 1.6 micrometers, results in a good level of surface planarity without sacrificing much in the way of semiconductor performance.

The L-fill pattern of dummy surfaces on a surface of a semiconductor wafer has been shown to reduce the potential for electrical problems, as described above with respect to FIGS. 3a and 3b. The tendency for several active conductive traces and L-shaped surfaces 370 to be linked together, due to small variations in the semiconductor fabrication process, though reduced from the previous orientations discussed, may be further reduced with the elimination of some of the material used in creating the L-shaped surfaces 370.

Figure 5A:
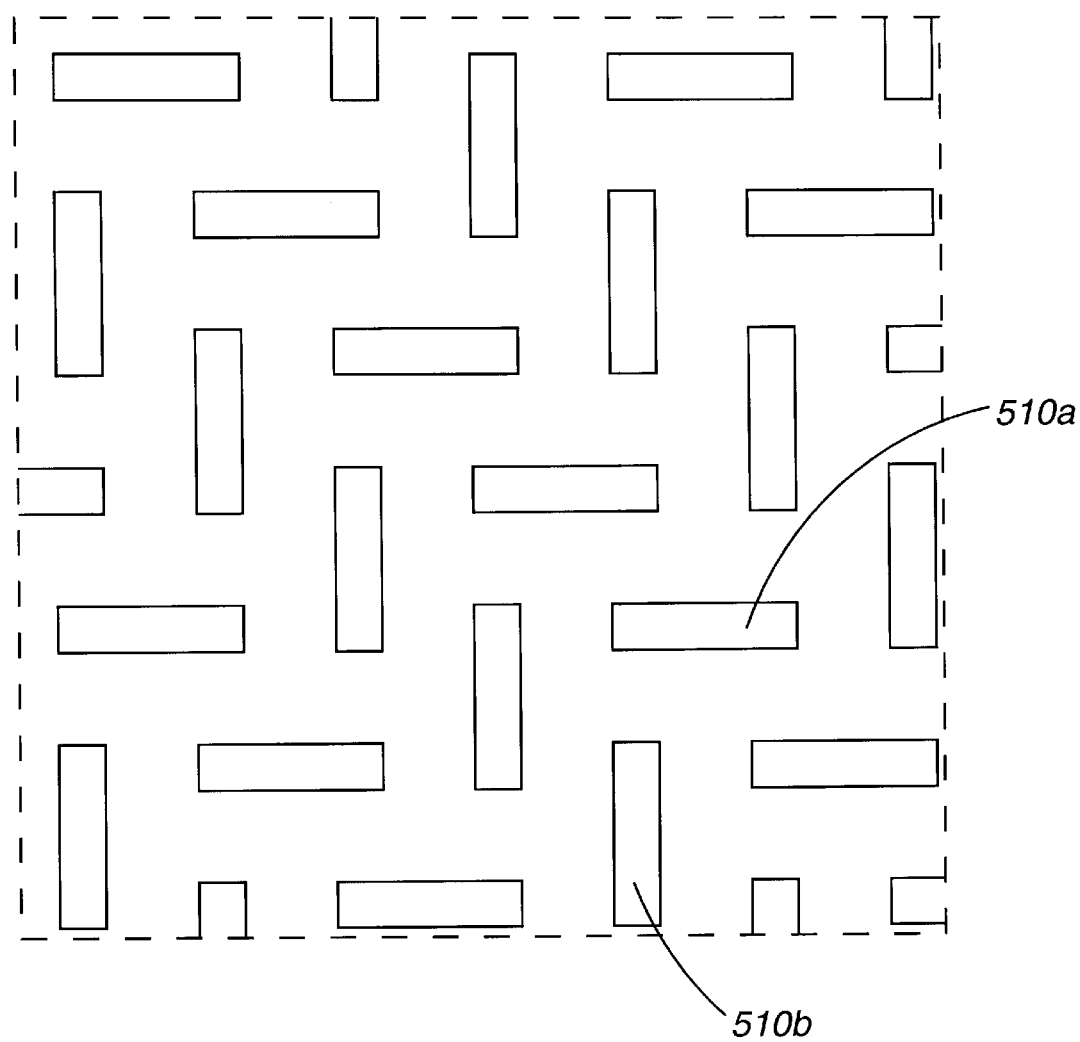
FIG. 5a is a diagrammatic illustration of a pattern of dummy surfaces arranged in a herringbone pattern in accordance with a fourth orientation of one preferred embodiment of the present invention.

Referring next to FIG. 5a, there is shown a diagrammatic illustration of a pattern of dummy surfaces arranged in a herringbone pattern in accordance with a fourth orientation of one preferred embodiment of the present invention. The micro-pattern of dummy surfaces as shown in FIG. 5a is comprised of a multiplicity of rectangular dummy line segments 510, where rectangular dummy line segments 510 have appreciable widths and lengths. As was the case with the previously described fill-patterns, the herringbone pattern may be thought of globally as a pattern of two intersecting parallel lines. The herringbone pattern, however, differs from the previously described patterns in that the actual points of intersection between the two global sets of parallel lines occur at non-continuous portions of the lines, i.e. the global parallel lines formed by rectangular dummy line segments 510 intersect, although rectangular dummy line segments 510 themselves do not intersect. There are two configurations of rectangular dummy line segments 510. A first configuration 510a may be thought of as an equivalent of the top surface of an L-shaped surface and a second configuration 510b may be thought of as an equivalent of the bottom surface of an L-shaped surface, as described above with reference to FIG. 3c. In general, the combination of rectangular dummy line segments 510 in the two configurations 510a and 510b are a variation of the L-shaped surfaces. Rectangular dummy line segments 510 of each configuration are arranged in a diagonal pattern such that a herringbone pattern is formed, as shown in FIG. 5a. In this orientation, rectangular dummy line segments 510 of the two configurations 510a and 510b are shown to be perpendicular. However, in some cases, rectangular dummy line segments 510 of the two configurations 510a and 510b may take on other orientations, as for example an orientation where rectangular dummy line segments 510 of the two configurations 510a and 510b are placed at 45 degrees off from each other.

The placement of rectangular dummy line segments 510 is such that with alternating rectangular dummy line segments 510 set at 90 degree angles as shown, meandering paths are created between rectangular dummy line segments 510. The flow of SOG is then forced to flow through the meandering paths. As a result, the flow of SOG is inhibited from quickly flowing to the edge of a wafer, thereby resulting in an even coating of SOG on the wafer.

The dimensions of rectangular dummy line segments 510 and the dimensions of the spaces between rectangular dummy line segments 510 are chosen in order to best achieve good surface planarity on the surface of a semiconductor wafer without affecting semiconductor performance too extensively. It has been observed that rectangular dummy line segments 510 with widths in the range of approximately 1.5 to 5.0 micrometers, as for example approximately 2.6 micrometers, and lengths in the range of approximately 1.5 to 5.0 micrometers, as for example approximately 4.0 micrometers, work well. These surface dimensions, in conjunction with spacing between adjacent rectangular dummy line segments 510 in the range of approximately 0.35 to 5.0 micrometers, as for example 3.2 micrometers, have been shown to provide good surface planarity on a semiconductor wafer without severely compromising the performance of the semiconductors housed on the wafer.

Figure 5B:
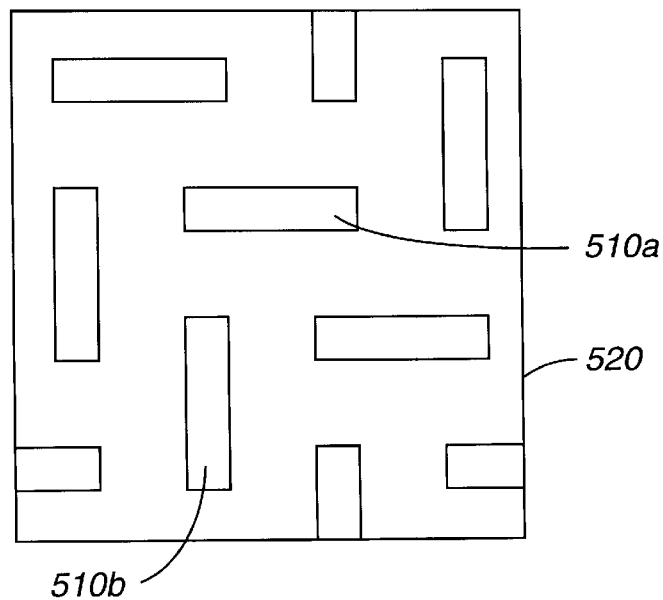

Referring next to FIG. 5b, there is shown a diagrammatic top view of the surface of a reticle 520, used in the lithography process, containing rectangular dummy line segments 510 oriented in a herringbone pattern. It should be understood that rectangular dummy line segments 510 are typically interspersed among metal traces on reticle 520. For ease of illustration, however, metal traces have not been shown on the surface of reticle 520. Also, the pattern density of rectangular dummy line segments 510, or dummy surfaces of any other shape, for that matter, is typically relatively high. However, the pattern density of rectangular dummy line segments 510 on reticle 520 is shown to be relatively low purely for illustrative purposes.

Figure 5C:
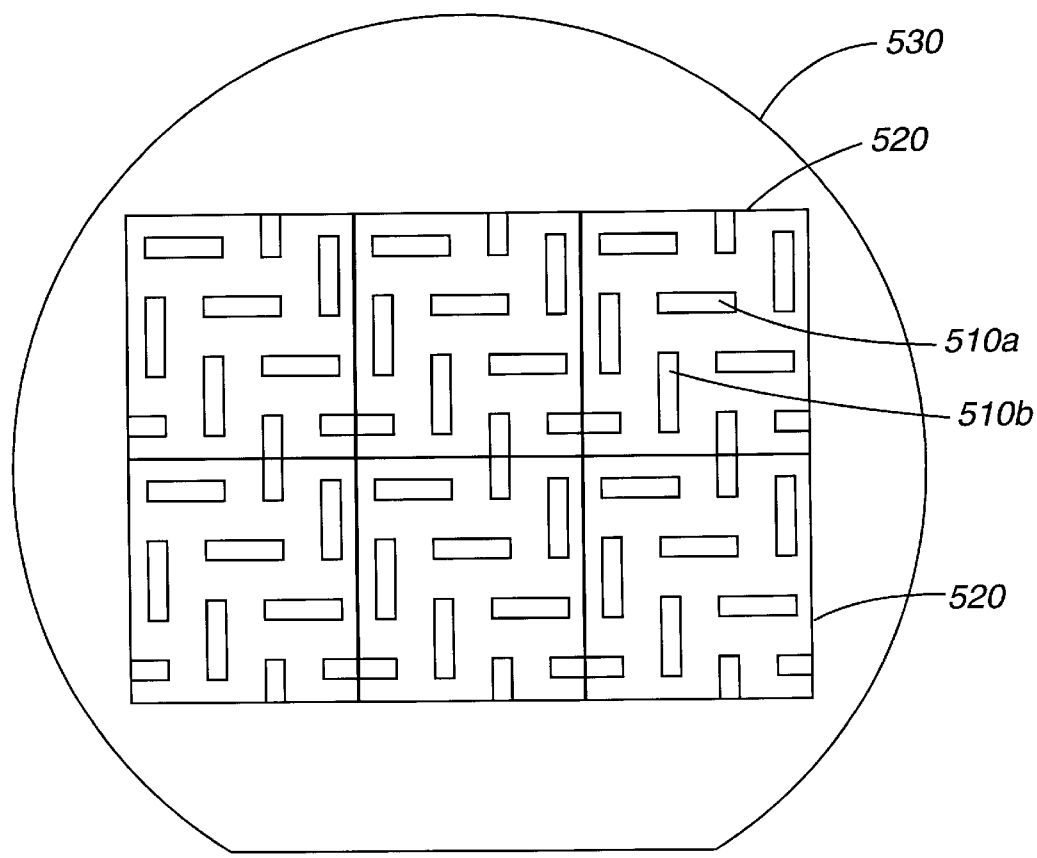
FIG. 5c is a diagrammatic top view of the surface of a semiconductor wafer with dummy surfaces in a herringbone pattern formed by the reticle of FIG. 5b.

FIG. 5c is a diagrammnatic top view of the surface of a semiconductor wafer with dummy surfaces in a herringbone pattern as formed by the reticle of FIG. 5b. The herringbone pattern is a micro-pattern, as the pattern of rectangular dummy line segments 510 which may be identified on reticle 520 is also identifiable over a substantial portion of wafer 530. Reticle 520 is stepped across a wafer 530 using conventional lithography equipment. The design of the herringbone pattern on reticle 520 is such that it is not necessary to rotate reticle 520 in order to step it across wafer 530. Typically, the circuitry for integrated circuits (not shown) on wafer 530 is such that a single reticle, as for example reticle 520, is all that is needed to produce the integrated circuits on wafer 530. The use of the herringbone pattern of rectangular dummy line segments 510 does not increase the number of reticles required to produce integrated circuits (not shown) on wafer 530. In other words, the herringbone pattern of rectangular dummy line segments 510 is such that the number of different reticles required to create integrated circuits (not shown) on wafer 530 with rectangular dummy line segments 510 does not increase from the number of different reticles required to created integrated circuits on wafer 530 without rectangular dummy line segments 510.

The herringbone pattern of rectangular dummy line segments 510 impedes the flow of SOG across wafer 530. Rectangular dummy line segments 510 are separated, as opposed to the intersecting lines which comprise the dummy surfaces previously described. Therefore, while rectangular dummy line segments 510 impede the flow of SOG by providing surfaces which are perpendicular to the flow of SOG and by creating meandering paths through which SOG must flow, rectangular dummy line segments 510 are less likely to contribute to the inadvertent connection of several active conductive traces in the event that there are small variations in the semiconductor fabrication process.

Although only a few embodiments of the present invention have been described, it should be understood that the present invention may be embodied in many other specific forms without departing from the spirit or scope of the invention. In particular, dummy fill surfaces may be implemented for use with any spin-on process in order to achieve planarity on the surface of a semiconductor wafer. While only a few orientations of dummy surfaces have been disclosed with respect to the present invention, it should be clear that other orientations may be implemented without departing from the spirit or the scope of the invention. Some possible orientations include, but are not limited to, orientations which incorporate a combination of cross-fill, T-fill, L-fill, and herringbone patterns.

The dummy fill patterns disclosed are comprised of two sets of parallel lines which intersect at 90 degree angles. However, the angles of intersection are not limited to 90 degrees, as the sets of parallel lines may intersect at any number of different angles. By way of example, two sets of parallel lines may intersect at 45 degree angles and 135 degree angles to form X-shaped surfaces. Similarly, more than two sets of parallel lines may intersect to form dummy fill patterns. Three sets of parallel lines, for example, may intersect to form surfaces shaped like asterisks.

Whereas the predetermined threshold distance for gaps between adjacent active conductive traces is stated as being greater than approximately 2 micrometers, as for example in the range of approximately 4.65 to 5 micrometers, this particular threshold may be raised and lowered as necessary. By way of example, if indentations in the SOG layer are observed in gaps which do not exceed the 2 micrometer threshold distance in width, the threshold distance may be lowered as necessary.

Similarly, although ranges for the surface dimensions of the dummy fill surfaces have been disclosed, the ranges may be adjusted as necessary. For example, if the gaps between adjacent active conductive traces for a particular integrated circuit design are large, it may be desirable to increase the size of the dummy fill surfaces situated in the gaps.

In some cases, it may be possible to orient active conductive traces in patterns which aid in the improvement of the planarity of semiconductor wafer surfaces. The orientation of active conductive traces on the surface of a wafer, to the extent that it is possible to orient the traces without compromising the electrical characteristics of integrated circuits housed on the wafer, to form cross-fill, T-fill, L-fill, or herringbone patterns, for example, may serve the purpose of at least partially eliminating the need for some of the dummy surfaces. Therefore, the present examples are to be considered as illustrative and not restrictive, and the invention is not to be limited to the details given herein, but may be modified within the scope of the appended claims.

I claim:

1. In the manufacture of integrated circuits, a method of processing a semiconductor wafer having at least one integrated circuit, the method comprising the steps of:
   forming a multiplicity of active conductive traces on a substrate of the wafer, the active conductive traces each being arranged to electrically couple associated elements of an associated integrated circuit on the wafer, there being gaps exceeding a threshold distance between at least some adjacent ones of the traces;
   forming a multiplicity of dummy surfaces on the substrate in the gaps, wherein the dummy surfaces are not arranged to electrically couple any elements in the integrated circuit, the dummy surfaces being arranged in a micro-pattern configured to inhibit a flow of a spin-on glass;
   depositing a dielectric layer over the active conductive traces to electrically insulate the active conductive traces;
   spinning a layer of glass over the dielectric layer to provide a planar surface on the wafer, the glass layer being superimposed over the active conductive traces and the dummy surfaces, wherein the dummy surfaces that are arranged in the micro-pattern inhibit the flow of the layer of glass to provide an even coating of the glass layer over the dielectric layer so as to provide the planar surface on the wafer; and
   etching the glass layer to expose at least portions of the dielectric layer.

2. A method as recited in claim 1 wherein the threshold distance is greater than approximately 2 micrometers.

3. A method as recited in claim 2 wherein the threshold distance is in the range of approximately 4.65 to 5 micrometers.

4. A method as recited in claim 1 wherein the dummy surfaces are formed from the same material as the active conductive traces and are applied at the same time as the active conductive traces, the dielectric layer being arranged to cover the dummy surfaces in addition to the active conductive traces.

5. A method as recited in claim 4 wherein:
   the active conductive traces and the dummy surfaces are formed from a metallic material; and,
   the dielectric layer is formed from an oxide material.

6. A method as recited in claim 1 wherein the wafer includes a plurality of integrated circuits and the dummy surfaces are oriented such that the active conductive traces and dummy surfaces in a plurality of the integrated circuits may be formed from a single reticle.

7. A method as recited in claim 1 wherein the multiplicity of active conductive traces form a first active layer of the wafer, the method further comprising the steps of forming additional active layers on the wafer by repeating the steps of claim 1 to form a plurality of layered active layers on the wafer.

8. A method as recited in claim 1 wherein the dummy surfaces comprise a plurality of sets of parallel lines which intersect to form the micro-pattern.

9. A method as recited in claim 1 wherein the dummy surfaces comprise a first set of parallel lines and a second set of parallel lines which intersect to form the micro-pattern, the dummy surfaces being line segments.

10. A method as recited in claim 9 wherein the first set of parallel lines and the second set of parallel lines are arranged such that the line segments which comprise the first set of parallel lines and the second set of parallel lines intersect to form elements selected from the group consisting of crosses, T-shaped surfaces, and L-shaped surfaces, the elements being arranged to form patterns selected from the group consisting of cross-fill patterns, T-fill patterns, and L-fill patterns.

11. A method as recited in claim 10 wherein the line segments have a first surface dimension in the range of approximately 1.0 to 2.4 micrometers and a second surface dimension in the range of approximately 1.0 to 12.0 micrometers.

12. A method as recited in claim 9 wherein the dummy surfaces are rectangular dummy line segments having a first surface dimension and a second surface dimension, the dummy surfaces being arranged in a herringbone pattern.

13. A method as recited in claim 12 wherein the first surface dimension and the second surface dimension are in the range of approximately 1.5 to 5.0 micrometers.

14. In the manufacture of integrated circuits, a method of processing a semiconductor wafer having at least one integrated circuit, the method comprising the steps of:
   forming a multiplicity of active conductive traces on a substrate of the wafer, the active conductive traces being arranged to electrically couple associated elements of an associated integrated circuit on the wafer, there being gaps exceeding a threshold distance between at least some adjacent ones of the traces, wherein the threshold distance is greater than approximately 2 micrometers;
   forming a multiplicity of dummy surfaces on the substrate in the gaps, wherein the dummy surfaces are not arranged to electrically couple any elements in the integrated circuit, the dummy surfaces being arranged in a micro-pattern configured to inhibit a flow of a spin-on glass;
   depositing a dielectric layer over the active conductive traces to electrically insulate the active conductive traces;

spinning a layer of glass over the dielectric layer to provide a planar surface on the wafer, the glass layer being superimposed over the active conductive traces and the dummy surfaces, wherein the dummy surfaces that are arranged in the micro-pattern inhibit the flow of the layer of glass to provide an even coating of the glass layer over the dielectric layer so as to provide the planar surface on the wafer; and etching the glass layer to expose at least portions of the dielectric layer.

15. A method as recited in claim 14 wherein the threshold distance is in the range of approximately 4.65 to 5 micrometers.

16. In the manufacture of integrated circuits, a method of processing a semiconductor wafer having at least one integrated circuit, the method comprising the steps of:

forming a multiplicity of active conductive traces on a substrate of the wafer, the active conductive traces being arranged to electrically couple associated elements of an associated integrated circuit on the wafer, there being gaps exceeding a threshold distance between at least some adjacent ones of the traces;

forming a multiplicity of dummy surfaces on the substrate in the gaps, wherein the dummy surfaces are not arranged to electrically couple any elements in the integrated circuit, the dummy surfaces being arranged in a micro-pattern configured to inhibit a flow of a spin-on glass, wherein the dummy surfaces comprise a first set of parallel lines and a second set of parallel lines which intersect to form the micro-pattern, the dummy surfaces being line segments;

depositing a dielectric layer over the active conductive traces to electrically insulate the active conductive traces;

spinning a layer of glass over the dielectric layer to provide a planar surface on the wafer, the glass layer being superimposed over the active conductive traces and the dummy surfaces, wherein the dummy surfaces that are arranged in the micro-pattern inhibit the flow of the layer of glass to provide an even coating of the glass layer over the dielectric layer so as to provide the planar surface on the wafer; and etching the glass layer to expose at least portions of the dielectric layer.

17. A method as recited in claim 16 wherein the first set of parallel lines and the second set of parallel lines are arranged such that the line segments which comprise the first set of parallel lines and the second set of parallel lines intersect to form elements selected from the group consisting of crosses, T-shaped surfaces, and L-shaped surfaces, the elements being arranged to form patterns selected from the group consisting of cross-fill patterns, T-fill patterns, and L-fill patterns.

18. A method as recited in claim 17 wherein the line segments have a first surface dimension in the range of approximately 1.0 to 2.4 micrometers and a second surface dimension in the range of approximately 1.0 to 12.0 micrometers.

19. A method as recited in claim 16 wherein the dummy surfaces are rectangular dummy line segments having a first surface dimension and a second surface dimension, the dummy surfaces being arranged in a herringbone pattern.

20. A method as recited in claim 19 wherein the first surface dimension and the second surface dimension are in the range of approximately 1.5 to 5.0 micrometers.

* * * * *